United States Patent Office 3,403,197
Patented Sept. 24, 1968

3,403,197
PREPARATION OF UNSATURATED OILS WITH A CRYSTALLINE VIOLET TITANIUM TRICHLORIDE AND ETHYL ALUMINUM DIHALIDE CATALYST
Charles W. Seelbach, Cranford, Erik G. M. Tornqvist, Roselle, and Arthur W. Langer, Jr., Watchung, N.J., assignors to Esso Research and Engineering Company, a corporation of Delaware
No Drawing. Continuation-in-part of application Ser. No. 692,050, Oct. 24, 1957. This application Dec. 1, 1965, Ser. No. 510,956
2 Claims. (Cl. 260—683.15)

This application is a continuation-in-part of Ser. No. 692,050, filed Oct. 24, 1957, now abandoned.

This invention relates to the low pressure polymerization of alpha olefins to low molecular weight unsaturated oils. More particularly, it relates to a process of this nature wherein the alpha olefin monomers having at least three carbon atoms are polymerized with a catalyst system containing a crystalline, partially reduced, heavy transition metal halide.

The low pressure polymerization of alpha olefins with catalyst systems made up of reducible, heavy transition metal compounds and a reducing, metal-containing compound to high density, isotactic, high molecular weight, solid, relatively linear products has been assuming ever increasing importance and is now well known, e.g., see Belgian Patent 533,362, "Chemical and Engineering News," Apr. 8, 1957, pages 12 through 16, and "Petroleum Refiner," December 1956, pages 191 through 196.

It has now surprisingly been found that alpha olefins can be polymerized to low molecular weight, highly unsaturated oils by the use of a catalyst system containing as one component a crystalline, partially reduced, heavy transition metal halide. In the present system, a complete active catalyst for promoting the formation of unsaturated polyolefin oils is formed by adding to the heavy transition metal halide an aluminum compound having the formula $AlR_mX_n$, wherein $m$ is a cardinal number from 0 to 1, $n$ is an integer from 2 to 3, $m+n$ totaling 3, R is a radical selected from the group consisting of alkyl and aryl radicals, said radicals preferably having from 1 to 6 carbon atoms, and X is a chlorine or bromine atom.

Although $AlR_2X$ activators when used in conjunction with partially reduced, transition metal halides are undesirable because they serve to produce high molecular weight, solid polymers, amounts up to about 25 wt. percent of $AlRX_2$ in the preferred activator system can be tolerated as the resulting catalyst still produces predominantly oily, liquid polymers. Presumably, this is due to the fact that $AlR_2X$ activators complex very strongly with transition metal halide surfaces and largely excludes the $AlR_2X$ activators from the active catalyst sites. The molar ratio of aluminum compound to transition metal compound in the catalyst system may vary from 1:4 to 50:1, preferably 2:1 to less than 5:1.

The alpha olefin feed utilized in the polymerization may have from 3 to 40, preferably 3 to 20, carbon atoms and thus includes propylene, butene-1, pentene-1, heptene-1, dodecene-1, tetradecene-1, etc.

Temperatures utilized in the preparation of the oily polymers may vary from about 0 to 250° C., preferably 30 to 200° C. although temperatures lower than 0° C. may also be advantageously employed, especially when lower molecular weight olefins such as propylene and butene-1 are polymerized. The pressures at which the reaction is conducted could vary in the range of about 0 to 1000 p.s.i.g., preferably 10 to 500 p.s.i.g., depending primarily upon the volatility of the olefin monomer and reaction diluent and upon the reaction temperatures used.

The principal component of the catalyst system utilized are crystalline, partially reduced, heavy transition metal halides. The metals exhibiting a catalytic activity are the transition metals of the IV, V, VI and VIII groups of the Periodic System, e.g., titanium, zirconium, hafnium, thorium, vanadium, niobium, tantalum, chromium, molybdenum and tungsten as well as iron, cobalt and nickel. The chlorides and bromides of the above-named metals are generally preferred; titanium, vanadium and zirconium chlorides, and bromides being the most active. Titanium tetrachloride, titanium tetrabromide, vanadium tetrachloride, zirconium tetrachloride, and zirconium tetrabromide may be readily reduced to the desired catalyst component at low activation temperatures.

Crystalline, violet $TiCl_3$ is particularly preferred as a crystalline reduced catalyst component. This material can be prepared in a number of ways:

(1) Reduction of $TiCl_4$—
  (a) by metals, i.e., Ti, Zr, Sb, Na, Al, etc., alone or catalyzed by various metal halides,
  (b) by hydrogen,
  (c) thermally at 600–1200° C.
(2) Reduction of $TiCl_4$ to brown amorphous solids which are converted to purple or violet crystalline $TiCl_3$ by heating above 150° to 200° C. The amorphous solids are prepared by
  (a) metal alkyl reduction of $TiCl_4$ at moderate temperatures, e.g., below about 100° C.,
  (b) hydrogen reduction initiated by silent electric discharges at temperatures below about 100° C.

The methods of preparation of these reduced heavy metal compounds are elaborated upon in U.S. Patent No. 3,128,252, issued Apr. 7, 1964.

The temperatures of reduction will vary with each particular combination of compounds used, but as a rule the most suitable temperatures are between about 150° and 600° C., except for straight thermal reduction (decomposition), and in most cases between 250° and 500° C. Naturally there is a minimum temperature that can be employed in each case, although quite often a somewhat higher temperature may give a more desirable product. The optimum reduction temperature will of course be below that at which over reduction or decomposition of the desired reduced transition metal compound takes place. The pressure may be from 1 to 50 atmospheres, preferably from 2 to 30 atmospheres, and the time may vary from a few minutes to 100 hours, or more, generally about 1 to 30 hours, depending of course upon the temperature and the types, proportions and amounts of materials used.

While the reduced metal halide, e.g., $TiCl_3$, itself may exhibit some catalyst activity, the latter is greatly enhanced by the addition of an aluminum compound having the formula presented previously. The selectivity of the type of aluminum compounds employed should be noted in that when one atom of halogen or less are attached to the aluminum atom, e.g., triethyl aluminum, a solid product is formed rather than the desired liquid. Typical utilizable compounds are $Al(CH_3)Cl_2$, $Al(C_2H_5)Cl_2$, $AlCl_3$, $$Al(CH_3)Br_2, \text{ etc.}$$

When the activating compound for the crystalline partially reduced transition metal halide is a trihalide, e.g., $AlCl_3$, it can be formed in situ during the Ti reduction procedure. In this case part of the reduction may be carried out by the transition metal itself. A soluble salt or salt mixture is then formed during the reaction. Depending upon the proportions and type of starting materials used, the soluble salt will either cocrystallize or intimately mix with the reduced transition metal compound. The following equations will illustrate this type of procedure.

(a)  $3TiCl_4 + Al \rightarrow 3TiCl_3 + AlCl_3$ (b)  $9TiCl_4 + Ti + 2Al \rightarrow 10TiCl_3 + 2AlCl_3$ (c)  $6TiCl_4 + Ti + Al \rightarrow 7TiCl_3 + AlCl_3$ (d)  $3VCl_4 + Al \rightarrow 3VCl_3 + AlCl_3$ The amount of catalyst used may vary within wide limits depending somewhat on the purity of the olefin feed. Proportions of as little as 0.1 part by weight of catalyst per 100 parts by weight of olefin are sufficient if the feed is pure. With olefin feed streams containing about 0.01% of water, oxygen, carbon dioxide or certain other oxygenated compounds, catalyst proportions of about 0.1–10 g. per liter of reaction mixture are usually adequate.

The preparation of the activated catalyst may be carried out in any desired manner, e.g., by adding a solution of $Al(C_2H_5)Cl_2$ dissolved in a suitable inert, organic solvent to a suspension of the reduced transition metal halide catalyst constituent at a suitable temperature ranging from 0 to 100° C. but preferably about 20 to 40° C., preferably with agitation to maintain the activated catalyst as a fine solid dispersion in the inert diluent.

The resulting activated dispersed catalyst is then ready for use in polymerizing propylene or other suitable olefins. This is preferably carried out by adding the olefin, in either gaseous or liquid state, directly to the reactor containing the dispersed catalyst in the diluent, preferably with constant agitation.

Paraffinic hydrocarbons such as isopentane, heptane, decane or other saturated petroleum or synthetic hydrocarbon oils, e.g., white mineral oil, naphthenes such as methylcyclohexane or Decalin, aromatics such as benzene, chlorobenzene, xylene, etc., are the most suitable diluents. It is important that a suitably high boiling diluent or a high enough pressure be chosen to maintain the diluent in liquid form at the temperature employed.

The unsaturated oil products are worked up by quenching the catalyst with alcohol, dilute acid, water, a chelating agent, and similar materials and then washing out the residue. The oil is isolated by distilling off the reaction diluent.

This invention and its advantages will be better understood by reference to the following examples.

Example 1.—$TiCl_4$ reduction by Ti+Al 142.3 grams (¾ mole) $TiCl_4$, 3.98 grams (1/12 atom) Ti and 4.49 grams (⅙ atom) Al were charged into a dry 300 ml. steel bomb. The bomb was placed on a heating rocker and heated to 435° C. for 25 hours. After cooling down and opening the bomb, an almost quantitative yield of a violet-purple homogeneous mixture of $TiCl_3$ cocrystallized with $AlCl_3$ in the mole ratio 5/1 was obtained. The product was microcrystalline and more easily powderized than the $TiCl_3$ prepared by reducing $TiCl_4$ with Ti in a similar fashion.

Example 2

One grams of $TiCl_3$ prepared by Ti reduction of $TiCl_4$ and 70 ml. of n-heptane were placed in a 300 ml. Cr-V steel microbomb. Cold liquid propylene (50 grams) was injected and the bomb heated to 200° C. for 20 hours. The reaction mixture was placed in 100 ml. of isopropanol and the mixture evaporated to dryness. The polymer was isolated as a brown oil (3.3 grams) with a molecular weight of 375 by cryoscopic procedure.

This example shows how the reduced $TiCl_4$, without any aluminum alkyl compound, operates itself as a catalyst, but only small product yields are obtained.

Example 3

Using the same technique as for Example 2 and the $TiCl_3$ prepared as in Example 1, 18.6 grams of oil was obtained which had a molecular weight, cryoscopic, of 349 and an unsaturation value of 105 cg. I/gram of polymer oil.

This example demonstrates that the $TiCl_3$ containing cocrystallized $AlCl_3$ is an effective catalyst and gives improved results over $TiCl_3$ alone.

Example 4

One-half gram of $TiCl_3$ (Ti metal reduction), 425 ml. of n-heptane and 3.8 ml. of 0.225 gram/ml. solution of ethylaluminum sesquichloride were added to a one liter Cr-V steel bomb. The aluminum sesquichloride contained 86% $AlEtCl_2$ and a minor amount of $AlEt_2Cl$. Cold liquid propylene (100 grams) was injected and the bomb heated to 84° C. for 20 hours. The resulting light brown oil weighed 67 grams for an overall catalyst efficiency of 50 gram/gram, had a cryoscopic molecular weight of 280 and an unsaturation value of 65.4 (cg. I/gram of polymer oil).

This example shows how improved results are obtained by using the activator compounds of this invention.

Example 5

A similar experiment to Example 4 omitting the $TiCl_3$ resulted in no liquid polymer.

This example demonstrates that the aluminum alkyl compound itself had no catalytic activity.

Example 6

A feed of 100 grams of propylene and 21 grams of heptane was charged to a bomb and polymerization conducted at 80° C. with a catalyst consisting of $CH_3AlCl_2$ and $TiCl_3$, the Al/Ti ratio being 3. A yield of 21.7 grams of oil product was obtained, indicating a catalyst efficiency in gram/gram of 11.

The features of these examples are further summarized in the following table.

TABLE I.—POLYPROPYLENE OILS

| Polymerization: | | | | |
|---|---|---|---|---|
| Catalyst | $TiCl_3$ | $TiCl_3$-$AlCl_3$ | $TiCl_3$ (0.86 $AlEtCl_2$ 0.14 $AlEt_2Cl$) | 0.86 $AlEtCl_2$ 0.14 $AlEt_2Cl$ |
| Cat. Eff., g./g | 3 | 19 | 50 | 0 |
| Polymer Properties: | | | | |
| Mol. Wt. cryoscopic | 375 | 349 | 280 | |
| Unsat. Value, cg. I/gram of polymer | | 105 | 65.4 | |

"Pretreated" catalyst systems, i.e., unreduced, heavy, transition metal halides which are treated with metal alkyls prior to contact with olefins also have some utility, e.g., $TiCl_4 + MeAlCl_2$ or $TiCl_4 + (C_2H_5)AlCl_2$.

Example 7

To further demonstrate the usefulness of the catalyst system of the present invention, a series of polymerization tests were conducted employing various types of titanium and vanadium compounds of varying crystal structure for the polymerization of a wide assortment of alpha olefins. In order to facilitate the interpretation of the data, the test runs have been grouped into three tables. Table II demonstrates the usefulness of a variety of catalyst combinations for making oils from propylene. Tables III and IV are related and illustrate the operability of certain catalysts in promoting the formation of polymer oils from butene-1, pentene-1, hexene-1, octene-1, and decene-1.

Each of the polymerization runs was conducted in a 283 milliliter chrome-vanadium steel bomb. According to the preferred polymerization procedure, the desired amount of diluent was first charged to a carefully dried steel bomb located inside a dry box containing essentially oxygen and moisture-free nitrogen. The transition metal halide was then introduced into the bomb followed by the metal alkyl activator. The metal alkyl catalyst activator was usually added as a 1 molar solution in the diluent chosen for the experiment. Following catalyst introduction, the desired amount of carefully dried monomer was injected into the bomb. In the case of butene-1 and higher alpha olefins the monomer was added in liquid form directly in the dry box whereupon the bomb was closed and transferred to a rocker.

In the case of propylene, the bomb was first closed and transferred to a heating rocker and then connected to a propylene feed system. The desired amount of propylene was condensed in an intermediate bomb positoned in a Dry Ice isopropanol bath. Prior to use, the propylene was purified by passing it through a barium oxide tower and a scrubber containing a 25% triethyl aluminum-paraffin oil mixture. The condensed propylene was transferred to the polymerization reactor by passing high pressure nitrogen through the intermediate bomb which was interconnected with the polymerization reactor.

In the case of both propylene and higher alpha olefins, the polymerization reaction was commenced by heating the bomb to the polymerization temperature. At the completion of the polymerization test, the bomb was removed from the rocker and opened and its contents poured into about 500 milliliters of dry isopropanol. On occasion, some solid or higher molecular weight liquid polymer precipitated from the polymer solution upon contact with the alcohol. When this occurred, the polymer was removed by filtration and the remaining liquid mixture evaporated on a steam bath. After this operation, a mixture of polyolefin oil and catalyst residues was secured from which the oil could be extracted with n-heptane. Minor amounts of catalyst residues which dissolved in the n-heptane solution were then removed by water extraction. The pure essentially colorless polyolefin oil was recovered from the organic solution by evaporating the n-heptane.

The polymer oils thus obtained were then submitted for analysis to determine cryoscopic molecular weight and iodine number (cg. I/gram of polymer oil). The results of the tests are set forth in Tables II–IV below.

TABLE II

| Test | 1 | 2 | 3 | 4 | 5 | 6 |
|---|---|---|---|---|---|---|
| Catalyst: | | | | | | |
| Transition Metal Halide: | | | | | | |
| Composition | Beta-TiCl$_3$ [a] | Beta-TiBr$_3$ [b] | Beta-TiBr$_3$ [b] | VBr$_3$ [c] | VBr$_3$ [c] | VCl$_3$·0.33AlCl$_3$ [d] |
| Weight, g | 0.309 | 0.72 | 0.72 | 0.73 | 0.365 | 0.5 |
| Alkyl Aluminum Halide: | | | | | | |
| Composition | AlEtCl$_2$ | AlEtCl$_2$ | AlEtCl$_2$ | AlEtCl$_2$ | AlEtCl$_2$ | AlEtCl$_2$ |
| Weight, g | 0.254 | 0.635 | 0.635 | 0.635 | 0.159 | |
| Al/Transition Metal Molar Ratio | 1 | 2 | 2 | 2 | 1 | 0.33 |
| Reaction Conditions: | | | | | | |
| Propylene, g | 50 | 75 | 75 | 75 | 50 | 50 |
| Diluent: | | | | | | |
| Type | n-Heptane | Benzene | Benzene | Benzene | n-Heptane | n-Heptane |
| Volume, ml | 100 | 50 | 50 | 50 | 100 | 100 |
| Temperature, °C | 40 | 75 | 30 | 100 | 80 | 80 |
| Time, hrs | 20 | 4 | 20 | 4 | 20 | 20 |
| Results: | | | | | | |
| Solid or High Mol. Wt. Liquid Polymer, g | 0 | 0.1 | 0.49 [e] | 7.3 [f] | 3.1 | 0 |
| Liquid Polymer, g | 0.8 | 3.7 | 2.2 | 12.6 | 2.0 | 4.4 |
| Properties of Oily Polymer: | | | | | | |
| Molecular Weight (Cryoscopic) | 613 | | 588 | 421 | 392 | 361 |
| Iodine Number | | | 42.8 | | 73.0 | 81.8 |

[a] Prepared by gamma radiation induced reduction of TiCl$_4$ in n-heptane.
[b] Prepared by reduction of TiBr$_4$ with activated aluminum powder in benzene slurry at 80° C. AlBr$_3$ formed in the reaction is hydrocarbon soluble and is essentially removed by washing. Preparation steel ball milled 6 days.
[c] Prepared by halogen exchange between HBr and VCl$_3$ in liquid AlBr$_3$ at 240° C. Preparation steel ball milled 3 days.
[d] Prepared by reduction of VCl$_4$ with the stoichiometric amount of aluminum powder at 240° C. in a steel bomb according to the method disclosed in U.S. Patent 3,128,252.
[e] Extremely tacky semi-solid low mol. wt. material.
[f] Largely amorphous material.

TABLE III

| Test | 7 | 8 | 9 | 10 | 11 |
|---|---|---|---|---|---|
| Monomer Type | Butene-1 | Butene-1 | Butene-1 | Pentene-1 | Pentene-1 |
| Catalyst: | | | | | |
| Transition Metal Halide: | | | | | |
| Composition | Alpha-TiCl$_3$ [a] | Beta-TiCl$_3$ [b] | VBr$_3$ [c] | Alpha-TiCl$_3$ [a] | Alpha-TiCl$_3$ [a] |
| Weight, g | 0.77 | 0.309 | 0.73 | 0.77 | 0.309 |
| Alkyl Aluminum Halide: | | | | | |
| Composition | AlEtCl$_2$ | AlEtCl$_2$ | AlEtCl$_2$ | AlEtCl$_2$ | AlEtCl$_2$ |
| Weight, g | 1.91 | 0.254 | 0.635 | 1.91 | 0.254 |
| Al/Transition metal Ratio | 3 | 1 | 2 | 3 | 1 |
| Reaction Conditions: | | | | | |
| Monomer, g | 56 | 50 | 75 | 50 | 50 |
| Diluent: | | | | | |
| Type | n-Heptane | Chlorobenzene | Benzene | n-Heptane | Chlorobenzene |
| Volume, ml | 61 | 100 | 100 | 100 | 100 |
| Temperature, °C | 80 | 25 | 100 | 80 | 40 |
| Time, hrs | 4 | 20 | 4 | 4 | 20 |
| Results: | | | | | |
| Solid or High Mol. Wt. Liquid Polymer, g | 2.3 [d] | 0 | 4.3 [d] | 2.1 [d] | 0.6 [d] |
| Liquid Polymer, g | 3.6 | 0.4 | 13.4 | 9.7 | 2.0 |
| Properties of Oily Polymer: | | | | | |
| Molecular Weight (Cryoscopic) | | 661 | 373 | 527 | 446 |
| Iodine Number | | | 44.9 | 35.5 | 72.9 |

[a] Prepared by hydrogen reduction of TiCl$_4$ at about 1,000° C. Preparation steel ball milled 6 days. Hence, may also be considered as delta-TiCl$_3$.
[b] See Table II, Footnote (a).
[c] See Table II, Footnote (c).
[d] Low Mol. wt. polymer.

TABLE IV

| Test | 12 | 13 | 14 | 15 |
|---|---|---|---|---|
| Monomer Type | Hexene-1 | Octene-1 | Octene-1 | Decene-1. |
| Catalyst: | | | | |
| Transition Metal Halide: | | | | |
| Composition | Alpha-TiCl₃ [a] | Alpha-TiCl₃ [a] | Beta-TiCl₃ [b] | Alpha-TiCl₃.[c] |
| Weight, g | 0.309 | 0.25 | 0.309 | 0.77. |
| Alkyl Aluminum Halide: | | | | |
| Composition | AlEtCl₂ | AlEtCl₂ | AlEtCl₂ | AlEtCl₂. |
| Weight, g | 0.254 | 0.412 | 0.254 | 1.91. |
| Al/Transition Metal Ratio | 1 | 2 | 1 | 3. |
| Reaction Conditions: | | | | |
| Monomer, g | 50 | 50 | 50 | 50. |
| Diluent: | | | | |
| Type | n-Heptane | n-Heptane | n-Heptane | n-Heptane. |
| Volume, ml | 100 | 100 | 100 | 100. |
| Temperature, °C | 80 | 85 | 80 | 80. |
| Time, hrs | 20 | 20 | 20 | 4. |
| Results: | | | | |
| Solid or High Mol. Wt. Liquid Polymer, g | 0 | 0 | 0 | 2.2.[d] |
| Liquid Polymer, g | 3.6 | 2.0 | 0.7 | 26.3 |
| Properties of Oily Polymer: | | | | |
| Molecular Weight (Cryoscopic) | 551 | | 655 | 747. |
| Iodine Number | 50.0 | | | 33.5. |

[a] Prepared by hydrogen reduction of TiCl₄ at about 1,000° C.
[b] See Table II, Footnote (a).
[c] See Table III, Footnote (a).
[d] Semi-solid material.

The data presented in the three tables above clearly demonstrate the nature and scope of the instant invention in that polymeric oils were formed from a wide variety of alpha olefins using catalyst systems made up of transition metal compounds of differing crystalline form in combination with a monoalkyl aluminum dihalide compound.

The advantages of this invention will be apparent to those skilled in the art. Novel polymer oils of valuable properties are obtained.

The oils of this invention have at least one double bond per molecule and exhibit cryoscopic molecular weights varying from 150 to 1500, preferably 200 to 1000. The oils are useful synthetic intermediates in the preparation of detergents, lube oil additives, V.I. improvers, flotation agents, parasitical and agricultural oils, plasticizers, etc. Oils formed by 1,2-addition from $C_4$ to $C_{20}$ alpha olefins that have iodine numbers between about 30 to 80 are particularly desirable products.

It is to be understood that this invention is not limited to the specific examples which have been offered merely as illustrations and that modifications may be made without departing from the spirit of the invention. For example, the mol. wt. of the polymer oils obtained may be changed by the addition of various mol. wt. influencing agents such as hydrogen, and the catalytic properties of the catalyst modified by the addition of known catalyst modifiers such as alcohols, amines, phosphorics, ethers, esters of organic and inorganic acids, amides, and other compounds exhibiting considerable polarity and/or Lewis base character.

What is claimed is:

1. A process for preparing low molecular weight, highly unsaturated oils comprising polymerizing an olefin having 3 to 20 carbon atoms under polymerizing conditions at a temperature in the range of 30 to 200° C. in a hydrocarbon diluent and a pressure in the range from 10 to 500 p.s.i.g. with a catalyst system comprising a crystalline violet titanium trichloride catalyst activated with a monoalkyl aluminum dihalide wherein the molar ratio of said monoalkyl aluminum dihalide to the titanium trichloride in the catalyst system in less than 5:1 and recovering as the predominant product oily, liquid polymers of said olefin having a cryoscopic molecular weight varying from 150 to 1500 and an iodine number of from 30 to 80 centigrams I/gram of polymer oil.

2. A process for preparing low molecular weight, highly unsaturated oils comprising polymerizing an alpha olefin having from 3 to 20 carbon atoms in a hydrocarbon diluent at a temperature of 30 to 200° C. and a pressure from about 10 to 500 p.s.i.g. with a catalyst comprising a crystalline violet, titanium trichloride activated with ethyl aluminum dichloride, the molar ratio of ethyl aluminum dichloride to titanium trichloride varying from 2:1 to less than 5:1 and recovering as the predominant product oily, liquid polymers of said alpha olefin having a cryoscopic molecular weight varying from 150 to 1500 and an iodine number of from 13 to 80 centigrams I/gram of polymer oil.

References Cited

UNITED STATES PATENTS

| | | | |
|---|---|---|---|
| 2,168,271 | 1/1939 | Perquin et al. | 260—683.15 X |
| 2,970,133 | 1/1961 | Sistrunk | 260—683.15 X |
| 3,116,274 | 12/1963 | Boehm et al. | 260—683.15 X |
| 3,118,865 | 1/1964 | Bruce et al. | 260—683.15 X |
| 3,153,634 | 10/1964 | Thomas | 260—683.15 X |
| 3,251,901 | 5/1966 | Bacskai | 260—683.15 |

DELBERT E. GANTZ, *Primary Examiner.*

PAUL M. COUGHLAN, JR., *Examiner.*

G. CRASANAKIS, *Assistant Examiner.*